May 2, 1950 — G. W. WOLCOTT — 2,506,534
PLURAL-WAY COCK

Filed Sept. 24, 1943 — 2 Sheets-Sheet 1

Inventor
G. W. Wolcott,
By C. B. Stevens
Attorney

May 2, 1950 G. W. WOLCOTT 2,506,534
PLURAL-WAY COCK
Filed Sept. 24, 1943 2 Sheets-Sheet 2
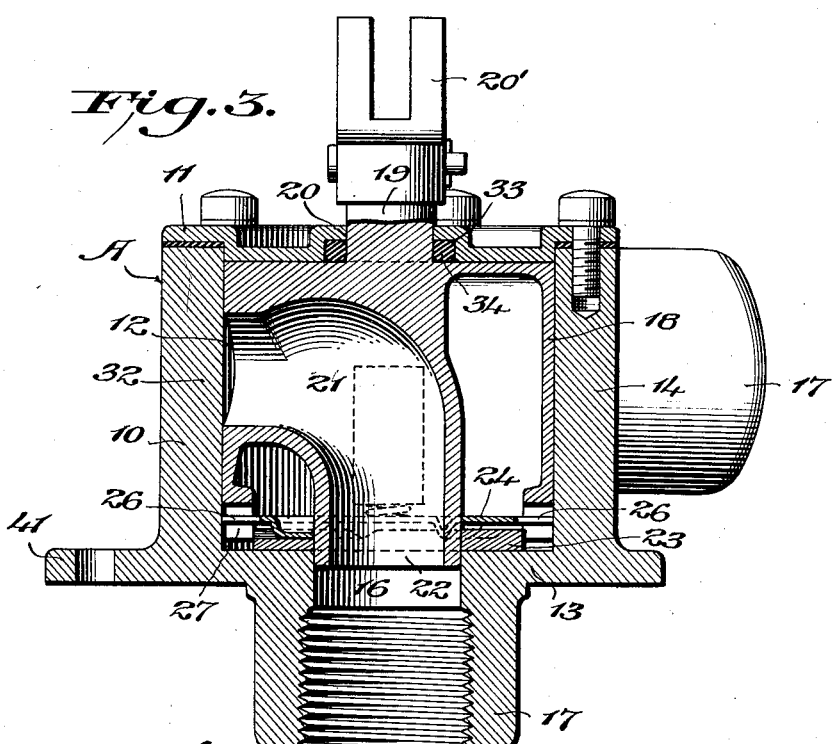
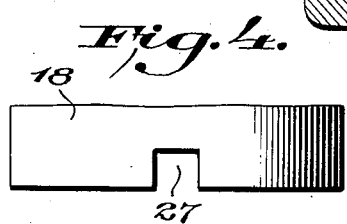
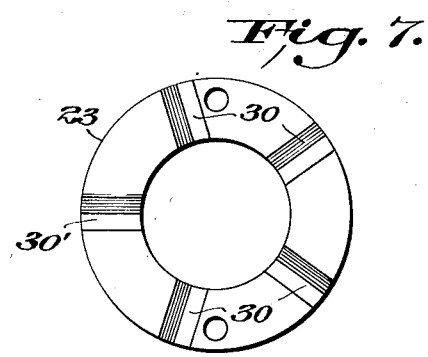
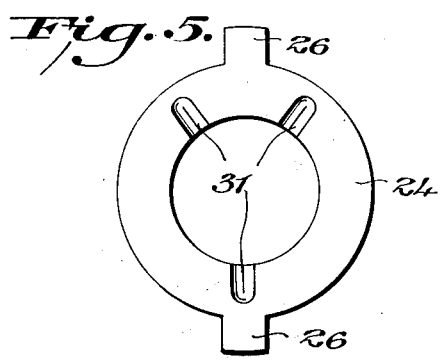
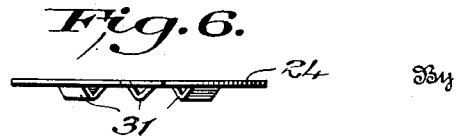
Inventor
G. W. Wolcott,
By C. B. Stevens
Attorney Patented May 2, 1950

2,506,534

UNITED STATES PATENT OFFICE 2,506,534

PLURAL-WAY COCK

Glenn W. Wolcott, Dayton, Ohio, assignor to United Aircraft Products, Inc., Dayton, Ohio, a corporation of Ohio Application September 24, 1943, Serial No. 503,688

2 Claims. (Cl. 251—103)

This invention relates to plural-way cocks, especially for aircraft use to selectively establish communication between main and auxiliary fuel tanks and engines, but, of course, capable of many other uses, and has particular reference to improvements in plural-way cocks of the rotary plug type.

Generally speaking, the object of the invention is to provide a simple, compact plural-way cock of the rotary plug type which may be produced expeditiously and at low cost, which has low torque, prominent indexing, excellent flow and effective sealing characteristics, and which is thoroughly reliable and efficient in operation.

With the foregoing and other objects in view, which will become more fully apparent as the nature of the invention is better understood, the same consists in a plural-way cock embodying the novel features of construction, combination and arrangement of parts as will be hereinafter more fully described, illustrated in the accompanying drawings and defined in the appended claims.

In the accompanying drawings, wherein like characters of reference denote corresponding parts in the different views:

Figure 3 is a section on the line 3—3 of Figure 1.

Figure 4 is a side elevation of the lower portion of the rotary plug.

Figure 5 is a plan view of one of the indexing plates.

Figure 6 is a side elevation of the indexing plate shown in Figure 5.

Figure 7 is a plan view of the other indexing plate; and

Figure 8 is a side elevation of the indexing plate shown in Figure 7.

Figure 1:
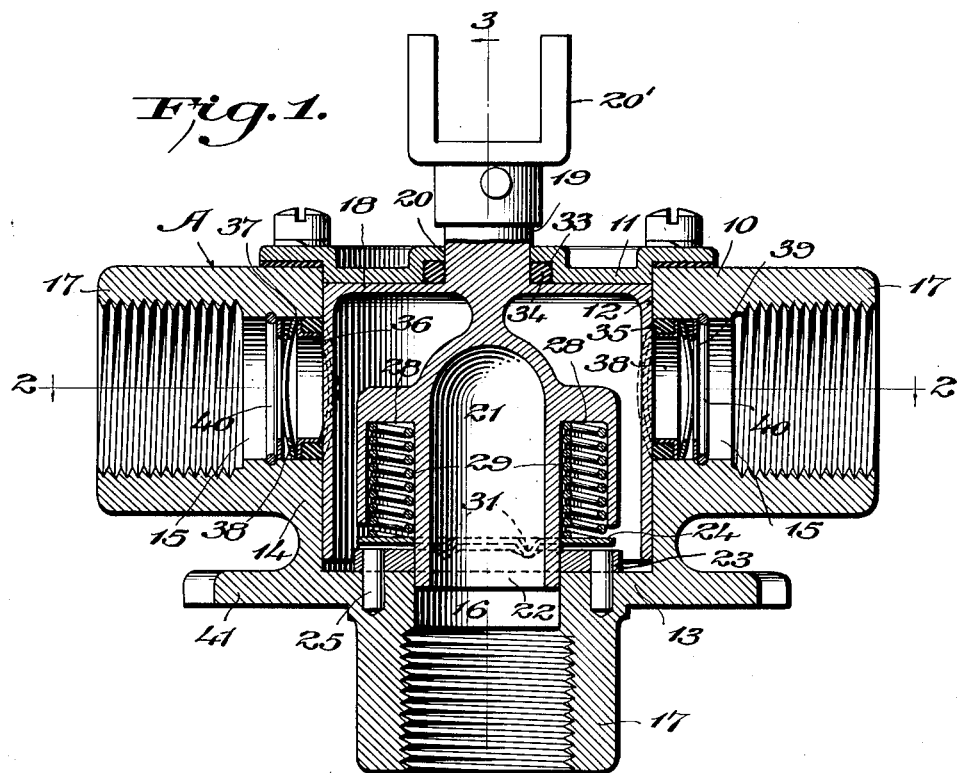
Figure 1 is a longitudinal section through a plural-way cock constructed in accordance with one practical embodiment of the invention.
Figure 2:
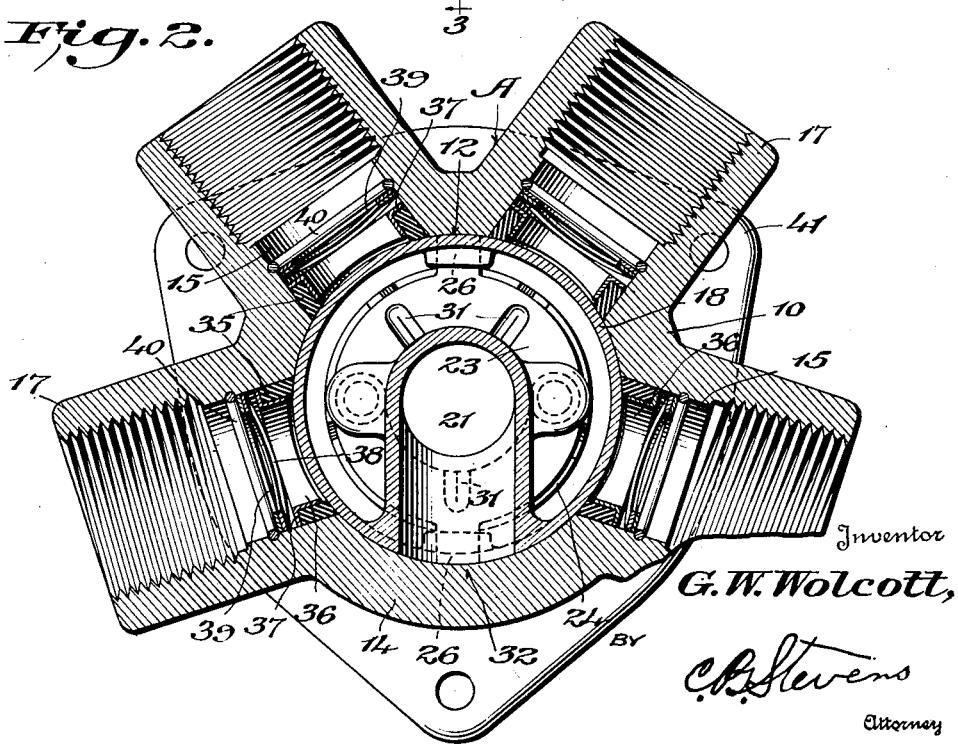
Figure 2 is a section on the line 2—2 of Figure 1.

Referring to the drawings in detail, A designates the casing of the present cock which is composed of a body 10, and a removable cover 11.

In the body 10, centrally thereof, is a cylindrical chamber 12 which is closed at one end by an end wall 13 of said body and at its other end by the cover 11, while in the side wall 14 of said body is a plurality of fluid inlet or outlet openings 15 which are angularly spaced apart around said chamber 12 and which open into the sides of the latter.

In addition, the end wall 13 of said body is provided with a single fluid inlet or outlet opening 16 which is axially alined with the chamber 12 and which opens into the adjacent end thereof. Preferably, though not necessarily, hollow bosses 17 extend from the body 10 in alinement with the openings 15 and 16 and are internally threaded for the connection therewith of fluid supply or delivery pipes (not shown) which are in constant communication with said openings.

Disposed in and closely fitting the chamber 12 and rotatable therein is a plug 18 which preferably, though not necessarily, is hollow and which is provided at one end with a stem 19 which extends through an opening 20 in the cover 11 to the exterior of the casing A where it may be provided with any suitable handle means 20' for effecting its rotation and thereby effecting rotation of said plug.

In the plug 18 is a passageway 21 which, at one end, opens through the side of said plug in the plane of the openings 15 and which, at its other end, opens through the end of said plug nearer the end wall 13 of the body 10 where it is alined with and in constant communication with the opening 16 in said end wall. Thus, by rotating the plug 18 to aline the first mentioned end of the passageway 21 with any one of the openings 15, that opening 15, to the exclusion of the remainder of said openings, may be placed in communication through said passageway with the opening 16. The openings 15 may be inlet openings and the opening 16 may be an outlet opening or the openings 15 may be outlet openings and the opening 16 may be an inlet opening. In either case, the plug 18 obviously, provides for establishing communication between the opening 16 and the openings 15 selectively.

Whether the plug 18 is solid or hollow, it preferably is provided at its end nearer the end wall 13 of the body 10 with a central, cylindrical projection 22 which is disposed in and closely fits the opening 16. Also, regardless of whether said plug is solid or hollow, the end of the same adjacent to the end wall 13 of the body 10 either is spaced from said end wall 13 or is recessed to provide space to accommodate a pair of superimposed, outer and inner indexing rings 23 and 24, respectively, the former of which is disposed against the inner face of said end wall 13 and is suitably held against rotation, as by being fastened to said end wall by pins 25, and the latter of which is suitably connected with the plug 18 for rotation therewith and for longitudinal movement with respect thereto as, for example, through the instrumentality of a pair of marginal tongues 26 thereon engaged in a pair of recesses 27 in said plug.

In the plug 18 on opposite sides of the passageway 21 is a pair of longitudinally extending bores 28 which are closed at their ends nearer the end of said plug from which the stem 19 extends and which are open at their other ends. In these bores are disposed expansion coil springs 29 which bear against the inner indexing ring 24 and against the walls defining the inner ends of the bores 28 and thereby tend constantly to urge said inner indexing ring toward the outer indexing ring and the plug 18 toward the cover 11.

In the inner face of the outer indexing ring 23 is a plurality of recesses 30, one for each of the openings 15, and one extra recess 30', while projecting from the inner indexing ring 24 toward the outer indexing ring 23 is at least one protuberance 31 for engagement in any one of the recesses 30 or 30'.

The recesses 30 have the same angular spaced apart relationship as the openings 15. Moreover, the protuberance 31 is located angularly with respect to the plug 18 so that when the first mentioned end of the passageway 21 is alined with any one of the openings 15 said protuberance is alined with the recess 30 related to that opening 15. Thus, when the plug 18 is rotated to aline the first mentioned end of its passageway 21 with any one of the openings 15, the springs 29, by urging the inner indexing plate 24 toward the outer indexing plate 23, will cause the protuberance 31 to enter the related recess 30 and thereby the plug 18 will be held against accidental rotation from that operative position. However, the spring 29 permits the ring 24 to yield inwardly so that the plug 18 may be forcibly rotated to aline the first mentioned end of its passageway 21 with any other of the openings 15.

The recess 30' is located to have the protuberance 31 aline with an enter the same when the first mentioned end of the passageway 21 is disalined from all of the openings 15 and is alined with a solid portion 32 of the side wall 14 of the body 10, thus to hold the plug 18 in a position of rotation denying communication between any of the openings 15 and the opening 16.

Preferably the openings 15 and the solid portion 32 of the wall 14 are spaced equal angular distances apart, in which event the indexing ring 24 may be provided, as shown, with a plurality of protuberances 31 angularly spaced apart to simultaneously enter a corresponding plurality of the recesses 30, 30'.

In the cover 11 in surrounding relationship to the stem 19 is an inwardly opening recess 33 in which is disposed a resilient sealing ring 34 of rubber, synthetic rubber, or like material which, at its inner side, is engaged by the adjacent end of the plug 18 and which is constantly pressed into said recess 33 by said plug under the influence of the endwise force exerted against said plug by the springs 29. Thus, said sealing ring is maintained deformed against the stem 19 and against the cover 11 and thereby effectively prevents any leakage of fluid from the casing A through the opening 20 in said cover through which said stem extends.

The operator of the cock may readily determine by the position of the handle 20' or by any equivalent indicating means when the first-mentioned end of the passageway 21 is approximately alined with any one of the openings 15 or with the closed wall portion 32, and in this connection the indexing rings 23, 24 afford means not only of releasably holding the plug 18 against rotation from different definite operative positions thereof, but of definitely determining these positions by the "feel" of the protuberance or protuberances 31 entering one or more of the recesses 30, 30'.

To prevent any leakage of fluid between the openings 15, 16, through the chamber 12 exteriorly of the plug 18, a sealing ring 35 of rubber, synthetic rubber, or the like, is disposed in each of the openings 15. The outer side face of each of these sealing rings engages the wall defining the side of the related opening 15 and the inner end face of each of said rings is formed to seat throughout its extent against the outer side face of the plug 18.

In each sealing ring 35 is a supporting ring 36 of sheet metal or other suitable non-yielding material which serves to prevent inward deformation of said sealing ring and which preferably is provided at its outer end with an outwardly extending lateral flange 37 overlying the outer end of said sealing ring, while exerting constant inward pressure against said flange and, therefore, against the sealing ring 35 is a suitable spring 38.

The inner end of each supporting ring 36 terminates sufficiently short of the inner end of the related sealing ring 35 so that only the inner end of the sealing ring engages the outer face of the plug 18. Thus, under the force exerted constantly inwardly against each sealing ring by its related spring 38, the inner end of each sealing ring is maintained fluid-tightly engaged with the outer face of the plug 18. Moreover, due to the tendency of each sealing ring to expand laterally under the influence of the spring force exerted inwardly thereagainst, and due to the supporting rings 36 holding said sealing rings against inward expansion or deformation, the outer faces of said sealing rings are maintained fluid-tightly engaged with the walls defining the sides of the openings 15. Consequently, any leakage of fluid between the chamber 12 and the openings 15 is effectively prevented.

While springs 38 of any suitable type may be provided to urge the sealing rings 35 inwardly, said springs 38 preferably are in the form of bowed rings of sheet metal interposed between the flanges 37 of the supporting rings 36 and suitable stops or abutments provided in the openings 15 outwardly of the sealing rings 35, said stops or abutment each comprising, for example, a flat ring or washer 39 closely fitting the related opening 15 and held against outward movement by a split ring 40 engaged in an annular groove in the wall defining the opening 15.

Obviously, the sealing means for the openings 15 are individually removable and replaceable without disturbing the plug 18 and said plug is removable and replaceable without disturbing said sealing means.

According to the specific embodiment of the invention illustrated in the drawings, the plug 18 is hollow and the passageway 21 is formed by a tube cast in said plug, the end portion of said tube adjacent to the end wall 13 of the body 10 constituting the aforesaid cylindrical projection 22 which is engaged in the opening 16. Also according to the specific embodiment of the invention illustrated in the drawings, the bores 28 are formed in bosses cast integral with said tube at opposite sides thereof and said tube extends through central openings in the indexing rings 23, 24, whereby the latter of said rings is guided for longitudinal movement and is held operatively disposed relative to the ring 23.

The end wall 13 of the body 10 may be extended as shown to provide a flange 41 for mounting the cock upon any desired support.

As will be manifest from the foregoing description considered in connection with the accompanying drawings, the present cock is of simple design and capable of being produced at low cost; it is, or may be, quite compact; it is easy to operate and has prominent indexing and sealing characteristics and in addition it has excellent flow characteristics due to the full, rounded form of the passageway 21 between its right angularly disposed end portions. Moreover, said cock is unlikely to get out of order and therefore is thoroughly reliable in operation.

Without further description it is thought that the novel features of the invention will be fully understood and their advantages appreciated. It is desired to point out, however, that while only a single, specific embodiment of the invention has been illustrated and described, the same is readily capable of embodiment in various other specifically different forms within its spirit and scope as defined in the appended claims.

What is claimed is:

1. A plural-way cock comprising a casing having a cylindrical chamber and a plurality of fluid inlet or outlet openings angularly spaced apart around said chamber and opening laterally into the same, said casing having an additional fluid inlet or outlet opening axially alined with said chamber and opening into one end thereof, a rotary plug in said chamber having therein a passageway opening through one end thereof and in constant communication with the last mentioned opening in said casing and also opening through the side thereof for alinement with any one of said first mentioned openings in said casing by rotation of said plug, thereby to place any one of said first mentioned openings in said casing in communication with the last mentioned opening therein, an indexing ring in said chamber disposed against the casing wall defining one end of said chamber and fixed with respect to said wall, a second indexing ring in said chamber inwardly of said first mentioned ring and keyed to said plug for rotation by and with the latter and for longitudinal movement relative thereto toward and from said first mentioned ring, spring means carried by said plug and reacting therefrom to urge said second mentioned ring toward said first mentioned ring and to urge said plug in the opposite direction, said rings having interfittable formations to releasably hold said plug against rotation from any position thereof in which its passageway is in register with any one of said first-mentioned openings in said casing, a stem projecting from said plug through an opening in the casing wall defining the other end of said chamber, and sealing means between said plug and said last mentioned casing wall urged into sealing engagement with said stem and said last mentioned casing wall by tendency of said plug to move toward said last mentioned casing wall under the influence of said spring means.

2. A plural-way cock, comprising a casing having a cylindrical chamber and a plurality of first fluid inlet or outlet openings angularly spaced apart around said chamber and opening laterally into the same, said casing having an additional second fluid inlet or outlet opening axially aligned with said chamber and opening into one end thereof, the opposite end of said chamber being closed by a closure plate or the like, a valve including a plug portion rotatably mounted in said chamber and having a passage therein one end of which is in continuous communication with said second fluid opening and the opposite end of which is brought selectively into communication with said first fluid openings, a stem on said valve passed through said closure plate, sealing means recessed in said closure plate and engageable by said plug portion, spring means pressing said valve in a direction to engage said plug portion with said sealing means, and indexing devices surrounding said plug portion within said chamber and operable by said spring means yieldingly to hold said valve in positions communicating said second fluid opening with selected first fluid openings.

GLENN W. WOLCOTT.

REFERENCES CITED

The following references are of record in the file of this patent:

UNITED STATES PATENTS

| Number | Name | Date |
|---|---|---|
| 913,861 | Wakfer | Mar. 2, 1909 |
| 1,607,827 | Herrmann | Nov. 23, 1926 |
| 1,954,018 | Miller | Apr. 10, 1934 |
| 2,030,458 | McKellar | Feb. 11, 1936 |
| 2,198,386 | Hiester | Apr. 23, 1940 |
| 2,217,963 | Mueller | Oct. 15, 1940 |
| 2,223,509 | Brauer | Dec. 3, 1940 |
| 2,233,840 | Koehler | Mar. 4, 1941 |
| 2,257,880 | Harper | Oct. 7, 1941 |
| 2,290,349 | Ohls | July 21, 1942 |
| 2,297,161 | Newton | Sept. 29, 1942 |
| 2,373,925 | Townhill | Apr. 17, 1945 |

FOREIGN PATENTS

| Number | Country | Date |
|---|---|---|
| 349,531 | Italy | June 16, 1937 |
| 665,650 | Germany | Sept. 30, 1938 |